US012192496B1

(12) United States Patent
Hegar et al.

(10) Patent No.: US 12,192,496 B1
(45) Date of Patent: Jan. 7, 2025

(54) CHANNEL FITTING FOR MEDIA PROCESSING

(71) Applicant: Amazon Technologies, Inc., Reno, NV (US)

(72) Inventors: Ryan Hegar, Happy Valley, OR (US); Eric Woodruff, Portland, OR (US); David William Cardwell, Portland, OR (US); Brian Enigma, Portland, OR (US); Karthik Bangalore Shamsunder, Portland, OR (US); Darin J. Klaas, Beaverton, OR (US)

(73) Assignee: Amazon Technologies, Inc., Reno, NV (US)

( * ) Notice: Subject to any disclaimer, the term of this patent is extended or adjusted under 35 U.S.C. 154(b) by 104 days.

(21) Appl. No.: 17/956,483

(22) Filed: Sep. 29, 2022

(51) Int. Cl.
*H04N 19/40* (2014.01)
*H04N 21/218* (2011.01)
*H04N 21/234* (2011.01)
*H04N 21/2187* (2011.01)

(52) U.S. Cl.
CPC ....... *H04N 19/40* (2014.11); *H04N 21/23418* (2013.01); *H04N 21/2187* (2013.01)

(58) Field of Classification Search
CPC .... H04N 19/40; H04N 19/102; H04N 19/103; H04N 19/146; H04N 21/23418; H04N 21/2187
USPC ..................................................... 375/240.03
See application file for complete search history.

(56) References Cited

U.S. PATENT DOCUMENTS

| | | | | |
|---|---|---|---|---|
| 8,897,365 | B2 * | 11/2014 | Reddy ................. | H04N 19/124 375/240.03 |
| 11,222,112 | B1 * | 1/2022 | Satpathy ................. | G06N 5/01 |
| 11,729,387 | B1 * | 8/2023 | Khsib ................. | H04N 19/124 375/240.03 |
| 2015/0222935 | A1 * | 8/2015 | King ................. | H04N 21/8549 348/48 |
| 2017/0164018 | A1 * | 6/2017 | Yadav ..................... | H04N 7/06 |
| 2021/0084382 | A1 * | 3/2021 | Kellicker ........... | H04N 21/2407 |
| 2021/0092418 | A1 * | 3/2021 | Han ..................... | H04N 19/597 |
| 2023/0101806 | A1 * | 3/2023 | John ..................... | H04N 19/196 375/240.02 |
| 2023/0188764 | A1 * | 6/2023 | Pahalawatta ......... | H04N 19/179 725/116 |

* cited by examiner

*Primary Examiner* — Dominic D Saltarelli
(74) *Attorney, Agent, or Firm* — Hogan Lovells US LLP

(57) ABSTRACT

Systems and methods in provide approaches for channel fitting to determine a particular number of resources, such as cores, that may be used for one or more processing jobs for a particular input channel. A given channel may be evaluated to determine performance affecting parameters and those parameters may be evaluated against previously known hardware configurations or against a historical heuristic dataset. A configuration for the channel may be selected where particular cores of a set of resources are assigned to the channel to perform one or more operations, such as transcoding operations. As a result, empirically determined or historical data may be used to efficiently allocate resources for different transcoding operations to provide both predictable performance and high utilization.

20 Claims, 10 Drawing Sheets

370

| Events | Physical Core | NUMA 0 | | | | | | | | NUMA 1 | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Event 0 | 304 | X | X | X | X | X | X | X | X | X | X | X | X | X | X | X | X |
| Event 1 | 306A | X | X | X | X | X | X | X | X | X | X | X | X | X | X | X | X |
| Event 2 | 306B | X | X | X | X | X | X | X | X | X | X | X | X | X | X | X | X |

380

| Events | Physical Core | NUMA 0 | | | | | | | | NUMA 1 | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Event 0 | 304 | X | X | X | X | X | X | X | X | | | | | | | | |
| Event 1 | 306 | | | | | | | | | X | X | X | X | X | X | X | X |

385

| Events | Physical Core | NUMA 0 | | | | | | | | NUMA 1 | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Event 0 | 304 | X | X | X | X | | | | | | | | | | | | |
| Event 1 | 306A | | | | | X | X | X | X | | | | | | | | |
| Event 2 | 306B | | | | | | | | | X | X | X | X | X | X | X | X |

390

| Events | Physical Core | NUMA 0 | | | | | | | | NUMA 1 | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Event 0 | 304 | X | X | X | X | | | | | | | | | | | | |
| Event 1 | 306A | | | | | X | X | X | X | | | | | | | | |
| Event 2 | 306B | | | | | | | | | X | X | X | X | | | | |
| Event 3 | 306C | | | | | | | | | | | | | X | X | X | X |

395

| Events | Physical Core | NUMA 0 | | | | | | | | NUMA 1 | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Event 0 | 304 | X | X | X | | | | | | | | | | | | | |
| Event 1 | 306A | | | | X | X | X | X | | | | | | | | | |
| Event 2 | 306B | | | | | | | | X | X | X | | | | | | |
| Event 3 | 306C | | | | | | | | | | | X | X | | | | |
| Event 4 | 306D | | | | | | | | | | | | | X | X | X | X |

FIG. 3F

CHANNEL FITTING FOR MEDIA PROCESSING

BACKGROUND

Content providers may perform audio and video transcoding for media content, such as both stored media content and live content streams. One or more operations may be used during the transcoding process that execute on a resource associated with a distributed computing environment, such as a cloud environment. Live video transcoding is computationally expensive and delays or errors may cause an impaired viewing experience for users. Additionally, computation over time may vary for live video content based on a number of factors, such as content complexity, structure of the content, and other factors. As a result, it may be difficult to determine an appropriate set of resources to perform transcoding, which often leads to unused resources reserved as backup, unpredictable performance, or to underutilized resources that could be used more effectively.

BRIEF DESCRIPTION OF THE DRAWINGS

Various embodiments in accordance with the present disclosure will be described with reference to the drawings, in which:

FIGS. 3A-3F illustrate example schematic representations of channel fitting and core assignments, in accordance with various embodiments.

DETAILED DESCRIPTION

Figure 1:
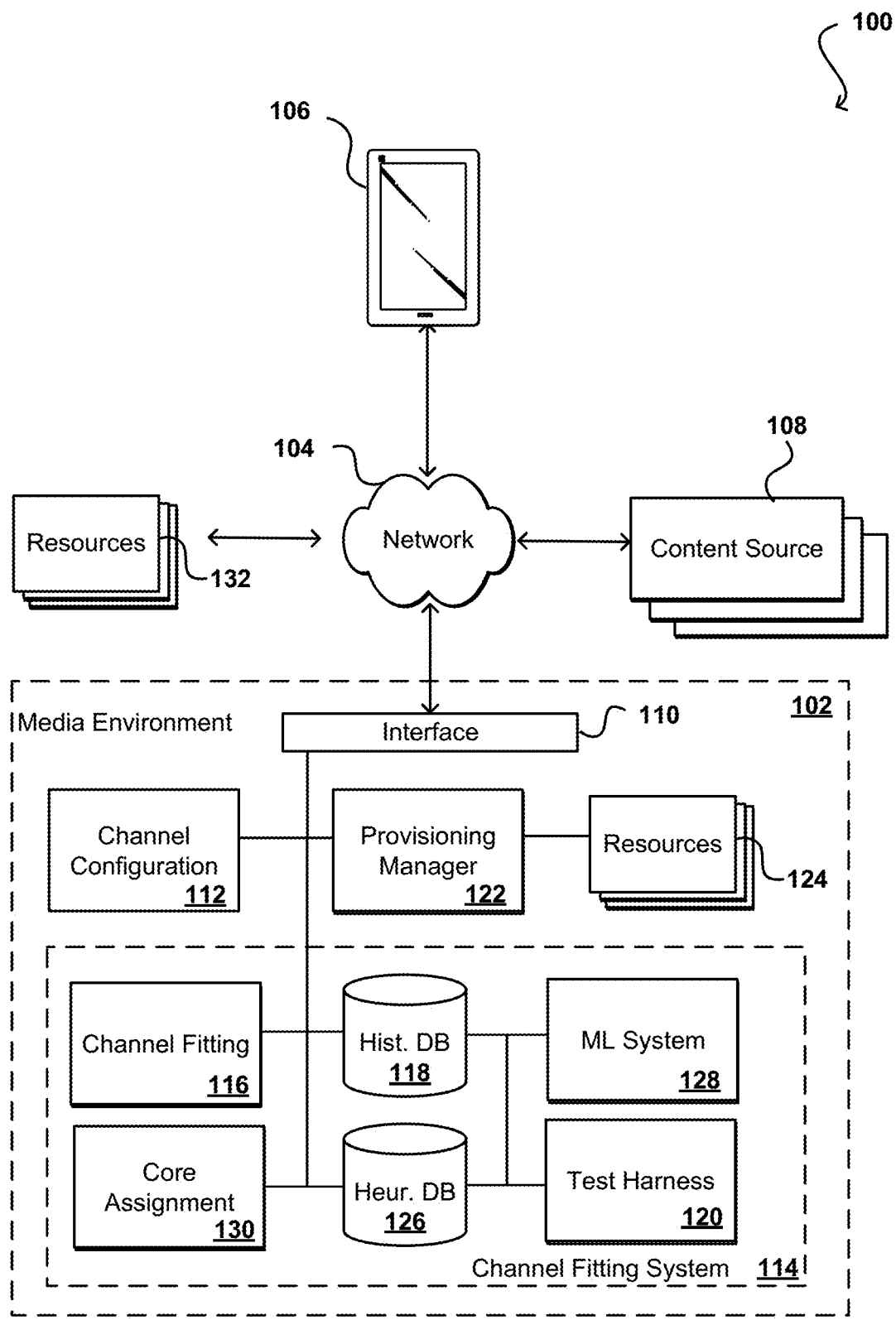
FIG. 1 illustrates an example system that can be used for provisioning resources for transcoding operations, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches to processing content, such as processing live video content. In particular, various embodiments provide approaches for channel fitting to determine a particular number of resources, such as cores, cards, or other network resources, that may be used for one or more processing jobs for a particular input channel. Systems and methods may improve predictability of hardware requirements for various channels in order to facilitate bin-packing channels onto hardware. Additionally, channel fitting systems and methods described herein may improve a density with which channels can be run on hardware devices, which may enable a more efficient use of resources without sacrificing processing capabilities and output quality. Additionally, the use of channel fitting may further reduce or eliminate performance-impacting interference across channels run on the same device. To that end, embodiments of the present disclosure may incorporate a test harness to empirically determine the resource requirements of one or more channels and then through assignments (e.g., CPU core assignments, GPU core assignments, card assignments, port assignments, etc.), segregate each channel's threads, which may maximize abilities to share local caches and memory and/or to use resources in more efficient ways, such as by using particular cards that are better suited for certain processing tasks.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Content providers can make various types of content available through mechanisms such as streaming. When streaming, a media player on a device will typically request content to be displayed or presented via that media player. The media player can begin to buffer the content as it is received, and initiate playback once a sufficient amount of content has been received. The playback can occur during the transfer of media content, or while the requested media content is "streaming" to the device.

Approaches in accordance with various embodiments can use one or more transcoders (e.g., audio and/or video transcoders) configured to transcode video on demand, or in response to a request for the content. Transcoding may be performed on live video, such as a live video stream, or on stored video content. Transcoding generally relates to the decoding and re-encoding of digital content from one format to another. Transcoding is often necessary to enable playback of media on different devices. It can be used to convert digital audio, digital video files, and/or video streams from one digital form or codec to another (e.g. MPEG2 to h.264 transcoding). Transcoding can also be used to adjust the bit rate of a video file and resize video resolution. Transcoding takes place in order for content to reach multi-screen end-user destinations. The complexity of transcoding comes from the vast range of devices, networks, and channels that may need to be supported. Further, in many instances, the presentation of textual information can be an important part of the digital content and can add to the complexity of transcoding the digital content. The content, once transcoded, can be delivered using a system such as a content delivery network (CDN). A CDN is an interconnected network of computer nodes that contain copies of various types of data. Using a CDN can improve access to the data cached at the nodes by increasing access bandwidth/redundancy and reducing access latency. CDNs are often used to provide access to media content.

In an example, a live video stream such as a football game can be provided for playback on a target video player. A video provider may coordinate with the content delivery service to permit the service to receive the live video stream at a distributed resource environment (e.g., a cloud environment, a cloud service) where one or more transcoding operations may take place using one or more resources that are provisioned to the video provider. One such resource may correspond to a container instance to receive and processes one or channels, with the channels corresponding to one or more inputs (e.g., video sources).

It should be appreciated that the channels may be attached to more than one input, and inputs may be processed sequentially. The channel contains the details that instruct the content delivery service how to transcode (e.g., encode and decode) and package the inputs into specific outputs, which may include specific output formats, specific output parameters, and the like. In at least one embodiment, channels may include at least an encode, an output, and an output group. The encode includes instructions for video, audio, and/or caption assets that will be created by the transcode process. A variety of different encodes, having different characteristics, may be used for different channels, different types of media content, and the like. For example, a first encode may be for high definition and a second encode may be for standard definition. Furthermore, audio encodes may different between AAC audio codec and a Dolby Digital audio codec. It should be appreciated that individual channels can include multiple video, audio, and captions encodes. Outputs may be a group of encodes that are used together, such as a combination of video, audio, and captions. Different packaging instructions may be used to group the outputs. The output groups may contain related outputs, and output groups can contain one or more outputs. The output groups may include destination information for the outputs.

FIG. 1 illustrates components of an example system 100 that can be used to provision resources and assign particular processing locations for one or more media transcoding operations in accordance with various embodiments. The figure illustrates a media environment 102, although it should be understood that various functions could be offered as a service to various parties or entities as well. Furthermore, the media environment 102 may have access, for example by communicating over one or more networks 104, such as Internet or cellular networks, to various software applications, data bases, and services that may be used along with, or in place of, various services associated with the media environment 102.

In this example, a client device 106, such as a computer device of an end user, may be used to send and receive instructions associated with one or more transcoding operations. For example, the client device 106 may be a content provider that directs media content from one or more content sources 108 for transcoding and distribution via the media environment 102. The content sources 108 may be local sources associated with a user of the client device 106, remove sources, on-site or off-site storage locations, or various combinations thereof. The request can be submitted directly to the media environment through a content link or a specified workflow, or directed to the content management service from another system or entity, among other such options. The request can relate to a task to be performed at the time of receipt or can be a request to schedule a future task.

The request can be received to an interface layer 110 or other such location or address of the media environment 102. The interface layer 110 may be used to route or otherwise direct the request to one or more modules or services of the media environment 102, which may include transmitting one or more instructions or requests for execution by different software systems. In this example, a channel configuration module 112 is used to evaluate one or more properties of the channels associated with the content source 108 to be processed by the media environment 102. In at least one embodiment, the one or more properties may be referred to as transcoding parameters, which may include a combination of content parameters and encoding parameters. The channel configuration module 112 may extract data associated with the channel, such as the particular encoding instructions, destination, content size, and the like. This evaluation may then be used to determine how to appropriately allocate resources and/or how to assign particular channels to already allocated resources, to accomplish one or more tasks associated with the channel. For example, a channel associated with high definition video output may need more cores to process data in real or near-real time than a low definition audio output. Accordingly, systems and methods of the present disclosure may use a channel fitting system 114 to determine a fit for the channels, allocate cores appropriately, and then provide information to enable an efficient allocation of resources while still providing predictable performance for the operations.

In at least one embodiment, channel fitting refers to the process of determining a number of cores (e.g., a minimum number of cores) on a particular hardware instance that are required to execute operations for a given channel. While various embodiments may be discussed with respect to cores, additional resources may also be allocated, assigned, evaluated, and the like. For example, rather than determining a number of cores for use, different cards (e.g., network interface cards, GPU cards, etc.) or other resource allocation may be evaluated for assignment of different processing jobs. Additionally, in at least one embodiment, channel fitting may also be associated with selecting or pushing jobs to different ports or various other applications for improving the use of underlying hardware resources. Regarding the example for determining a number of cores, the number of cores may vary based on several properties, such as CPU utilization, latency requirements, channel parameters, variable inputs, and different properties associated with underlying hardware, even within a common data center. The problems associated with channel fittings can be even more complex when real time systems are used, where hardware may be further subject to competing demands. In at least one embodiment, channel fitting may include an empirical approach to test various channel configurations against different hardware configurations to determine a "limit" or "edge" of performance and then use that hardware configuration in instances where channel configurations match (within some threshold) the empirically tested configurations. Additionally, once empirical data is acquired, different extrapolations may also be performed in order to estimate configurations that will enable processing on different sets of cores.

Various embodiments include a channel fitting module 116 to receive configuration information from the channel configuration module 112. The channel fitting module 116 may then evaluate the information, such as by checking a hash against a known set of configurations, which may be stored in a historical database 118. For example, previously executed jobs may be stored such that their associated underlying hardware configuration and one or more performance affecting parameters are recorded and hashed. As a result, the database 118 can be quickly checked for a match, or in some cases a near-match within a threshold, to determine whether a known hardware configuration is available. It should be appreciated that the information obtained from the channel configuration 112 may include both performance affecting parameters and performance benign parameters. Non-limiting examples of performance affecting parameters include size, codec, compression, resolution, frame rate, graphics, and the like. Non-limiting examples of performance benign parameters include file names, provider identity, provider location, and the like.

If an appropriately similar, or exactly similar, configuration is not located within the historical database 118, a test harness 120 may be used to determine channel fitting parameters for a given channel given the channel parameters. For example, the test harness 120 may receive the parameters and then communicate with a provisioning manager 122 to provision one or more resources 124 to run a test configuration using the parameters. While these components are shown as separate blocks in the illustrated embodiment, it should be appreciated that alternative configurations may be used within the scope of the present disclosure. For example, the test harness 120, provisioning manager 122, and resources 124 may be part of a common system or framework. Accordingly, the position of the components and/or separation is shown by way of example and for clarity with the present discussion. The underlying hardware configuration for the resources 124 may be set to a certain number of cores, the one or more channels may be set to execute on those cores, and then different parameters or factors may be adjusted or modified as the channel fitting module 116 monitors execution of the transcoding operations. Such an operation may enable empirical determinations of how a channel, given a set of properties, executes with a certain configuration of underlying resources. Accordingly, various tests may be executed to determine a number of cores, a configuration for the cores, placement of the cores, and the like for a given channel configuration. It should be appreciated that each parameter of the channel may not be known, but at least a threshold number of performance affecting channels may be known in order to provision the resources and to assign or otherwise distribute the channels over the cores. From there, testing may use a "difficult" configuration, such as a high resolution configuration, in order to provide a safety factor or a conservative estimate for later operations by a user. The results of the testing may then be stored within the historical database 118 to be used at a later time, such as when a similar channel with a sufficiently similar set of parameters is provided to the media environment 102.

In various embodiments, the parameters of the underlying hardware for the test harness 120 are based, at least in part, on a set of heuristics derived from a heuristics database 126. For example, past transcoding jobs may be evaluated and their associated parameters may be used to populate the heuristics database 126. In at least one embodiment, a machine learning system 128 may select a set of parameters, based at least in part on the heuristics database 126 and/or more parameters of the channel, to provide an initial configuration for the resources 124 used with the test harness 120. The machine learning system 128 may include one or more trained statistic models, which may be used to interpolate between different data within the heuristics database 126 in order to establish the parameters. Additionally, the machine learning system 128 may include one or more deep learning architectures, such as a neural network, that, given an input configuration, provides a set of underlying resource parameters.

Channel fitting may enable a core assignment module 130 to provide instructions to the provisioning manager 122 to configure a set of customer resources 132 (e.g., resources that the customer has reserved or has an agreement to use) based, at least in part, on data derived from the test harness 120 and/or the historical database 118. While channel fitting may refer to the minimum number of cores (or some resource configuration that may include cards or other network resources) necessary to run a given channel on particular hardware, core assignment may be used to efficiently select particular cores for operation. For example, all cores are not equal and may be distributed across different sockets, dies, etc. while having access to different memory caches. Assigning cores that use different caches may slow down performance. Accordingly, systems and methods may be used to assign both a physical core and its hyper-threaded partner to a same channel and, to the degree possible, allocate cores consecutively or clustered around the same die or socket. Furthermore, core assignment may also allocate particular channels to certain cores that may be more efficient or capable than others, for example cores with specialized hardware configurations. In this manner, cores may be efficiently allocated for both the parameters of an associated transcoding job as well as factors of the underlying hardware. Furthermore, as noted, while core assignment is described herein, assignment may generally refer to selecting one or more resources, which may or may not include cores. As a result, the core assignment module 130 may also be referred to as an assignment module 130 which is used to determine which resources are selected for processing different channels, such as selecting one or more cards, among other options.

Systems and methods may be directed toward executing multiple operations with multiple channels on a single instance with predictable performance through core assignments that segregate the channels. To this end, embodiments may enable efficient multi-tenancy to improve density, thereby reducing costs, while also enabling a system to automatically configure and assign channels to resources. In at least one embodiment, a minimum number of cores for a particular hardware configuration family is determined for a given channel. As a result, a maximum channel density of multi-tenant channels running on a server may be determined to provide predicable performance such that resources for the channels can be determined based on a channel configuration. Various embodiments may be directed toward distributed computing environments where a channel is processed on a set of resources associated with a video provider, where the resources may be an instance that is associated with underlying hardware having a certain number of cores. Increases in instance sizes may lead to significant increases in a number of associated cores, which may not be necessary for a channel or set of channels, thereby adding unnecessary cost and inefficiently using resources. Various embodiments address these inefficiencies through channel fitting.

In at least one embodiment, a channel fitting process may further include channel core isolation to refer to a candidate policy where physical cores and their hyperthreaded counterparts are used by a single channel. However, it should be appreciated that this constraint may be relaxed in various embodiments. Channel isolation may improve the amount of processing isolation between channels. For example, CPU usage may be efficiently allocated by reducing a likelihood that an unrelated application stalls access to memory due to its own memory requirements. Additionally, performance may be increased by assigning physical cores in a way to keep cores that share sockets, caches, and buses assigned to the same channel. These assignments could maintain improved core/cache locality over the lifetime of the channel. Furthermore, scheduling may be improved and, with that improvement, more predictable and reproducible results for later assignments may be generated. Additionally, channel fitting may be useful in predicting how to properly allocate resources, where a given known number of cores necessary to process a certain channel configuration may be known prior to attempting to provision or assign resources, which allows for remediating/mitigating action to be taken rather than attempting to allocate the channel, determine the existing configurations are unsuitable, and then provision additional resources. Furthermore, systems and methods may enable auto placement/bin packing, where a provider can choose how to optimally process transcoding operations, rather than receiving those instructions from a third party or from a content source.

Various embodiments of the present disclosure may also efficiently assign channels to cores while permitting core sharing. For example, if it is determined a channel only needs 3.25 cores to run, allocating an entire core for the 0.25 may lead to inefficiencies. Accordingly, systems and methods may permit another channel to share the core, such as a channel that needs 0.5 cores. Additionally, the shared core may be associated with a core executing administrative tasks or the like. This may increase the density for the cores associated with a given server, providing a more efficient use of resources.

As noted herein, channel fitting may refer to the process of determining the minimum number of cores on a particular hardware component, or associated instance using that hardware component, to execute a given transcoding operation. Large channels may contain hundreds of threads with different CPU utilization and latency requirements. Furthermore, a large number of parameters may affect performance (e.g., codec, resolution, inputs, outputs, etc.), and some of those parameters are not discrete (e.g., bitrate). Additionally, the number of inputs, outputs, codecs, and processing stages (e.g., deinterlaces, scales, etc.) may be variable. Moreover, the underlaying hardware executing the processes may be different (e.g., different clock rates, different manufacturers, different cache sizes, etc.). Given the dynamic nature of complex systems, a purely heuristic approach may be ineffective, and as a result, systems and methods may deploy, at least in part, an empirical approach to gather performance data. To that end, a test harness may be used to determine channel fitting for an existing channel. Parameters of that channel may be saved and stored, such as with a hash signature, where the signature is based on the subset of parameters that most affect performance. During testing, infrastructure is deployed to enable alterations to the number of cores available. As a result, newly started channels that match a cache entry (e.g., based on the hash signature) may use the channel fitting information obtained from the test harness in order to provision resources and/or assign channels. Newly started channels that do not match a cache entry may use heuristics to determine a minimum number of cores. The heuristics may be derived from data collected from the test harness, as well as previous transcoding jobs, to enable interpolation or machine learning techniques to suggest different configurations.

In at least one embodiment, because cores for a particular system may not all be equivalent, systems and methods may include core assignment in order to particularly select cores within a system to execute the transcoding operations on the channel. For example, with non-uniform memory architecture (NUMA) systems, there are sockets, CPU dies, multi-level caches, and buses that can affect how efficiently an application executes. Accordingly, one or more rules or parameters may be associated with core assignments, such as assigning both a physical core and its hyper-threaded partner to a same channel. Additionally, cores may be allocated to a channel to be clustered around the same die and/or socket in order to maximize cache benefits and minimize bus contention. In at least one embodiment for hardware supporting ingest and egress of uncompressed video (e.g., SDI, network cards, high-speed networks cards, uncompressed video over network, etc.), there may be certain cores that are more efficient at processing data due to proximity of the cores to the buses that the hardware resides on and/or the SDRAM into which it is accessing. Accordingly, channels that need to ingest/egress to hardware devices may be allocated accordingly.

It should be appreciated that channel assignment may be dynamic and may permit changes and/or adjustments. For example, there may be configurations where core assignment is non-optimal, such as where certain configurations cause a channel to span a socket or where too many channels are contending for cores that are optimal for accessing hardware devices. These situations may be addressed by establishing non-optimal core placement when running the test harness, thereby providing a more conservative or "worst case" approach. Such testing will ensure, even with poorly allocated cores, that a minimum amount of performance is still provided, and in many cases, will have improved performance when the worst case is not the actual configuration at runtime. It should be appreciated that multiple configurations may be run for the same set of channel parameters, and that the tests are associated with different core placement.

Various embodiments may also permit channel core migration. For example, while it may be preferable to maintain core assignments while an operation is running, systems and methods may permit reallocating and/or migration to different cores. In at least one embodiment, it may be preferable to have channels on consecutive cores. If such a configuration is suddenly available, for example due to a task completing or pausing, performance may be improved by migrating to the available cores.

Figure 2:
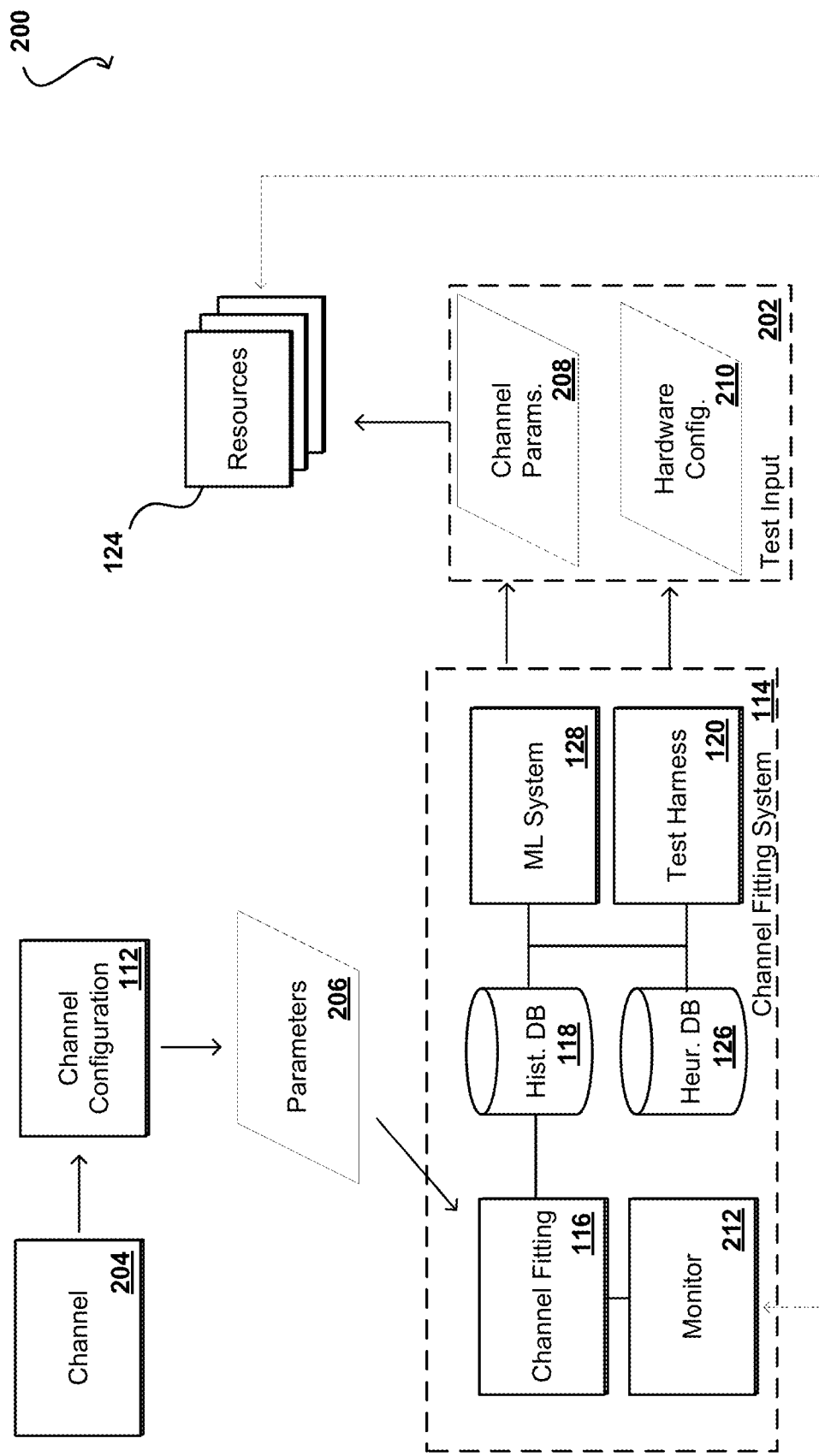
FIG. 2 illustrates an example system in which a testing harness can be used, in accordance with various embodiments.

FIG. 2 illustrates components of an example environment 200 where a test harness 120 may be used to determine operating characteristics for a test input 202. In this example, an input channel 204 is analyzed by the channel configuration module 112 to extract one or more parameters 206 from the channel 204. While all performance affecting parameters may not be known at the time the channel 204 is received, at least a threshold number of parameters may be sufficient to establish a signature, provision resources, and/or execute a test. In this example, the historical database 118 does not include a previously executed test with a signature sufficiently similar to the configuration of the channel 204 to use a known set of parameters. In such a situation, there may be a variety of different paths to proceed. By way of example only, a first path may be associated with configuring a set of resources based on heuristics to begin processing the request. This first path may be advantageous when a content source has provided a channel for immediate processing. A second path may be associated with executing the test harness 120 to determine an optimal and/or preferred configuration. This second path may be advantageous when a content source has provided a channel for future processing and there is sufficient time to execute the test prior to processing the resources. Additionally, the second path may also be used in situations where the channel 204 is one or more test channels that are being run by the provider in order to populate the database 118. Furthermore, in at least one embodiment, the first and second paths may be executed simultaneously and/or with at least some overlap, such that an initial set of resources is provisioned according to heuristics and the test is also conducted. Based on the results of the test, different resources may be provisioned or jobs may be migrated in order to use the test configuration. As noted above, with the second path, the channel fitting module 116 may be used to provide information to the test harness 120 to execute testing on the resources 124.

In various embodiments, the channel fitting system 114 is used to generate the test input 202, which may include at least channel parameters 208 and hardware configuration data 210. The channel parameters 208 may include at least a subset of the parameters determined from the channel 204. Additionally, as noted, because all parameters may be unknown, one or more additional parameters may be added to the channel parameters 208. In certain embodiments, the channel parameters 208 may be particularly selected to make the test input 202 "difficult" or challenging for the resources 124. In this manner, the test may evaluate a worst case scenario to provide a more conservative result. For example, a highest definition format may be used or uncompressed video may be evaluated. The hardware configuration data 210 may be determined, at least in part, from the heuristics database 126 and/or the machine learning system 128. This may include information such as a number of cores to allocate to the channel for testing, the underlying hardware used (e.g., brand, location, etc.), and the like. In at least one embodiment, the test may also evaluate a worst case scenario for hardware configurations, such as non-optimal core assignments, non-consecutive core assignments, and the like. The resources 124 may then execute one or more transcoding operations and certain metrics may be evaluated by a monitoring system 212. The metrics evaluated may include data such as CPU utilization, SVQ (speed-vs-quality), and dropped frames, but it should be appreciated that more or fewer metrics may be used. CPU utilization may be measured across all cores on an instance or may be evaluated using only the cores tested for the particular channel.

Testing may include attempting to execute the task on fewer cores, adjusting different parameters, and the like. A "limit" or "edge" may be determined, for example based on CPU utilization or other metrics, and a metric that achieves this limit or a threshold may cause the associated hardware parameters to be recorded. It should be appreciated that multiple tests may be conducted with different parameters. The data may then be stored and associated with a signature such that a channel with a similar set of parameters (e.g., exactly the same, within a threshold difference, etc.) can be provisioned to operate using the same tested parameters. In this manner, known efficient allocation of channels to cores may be used to increase density of different servers.

Figure 3A:
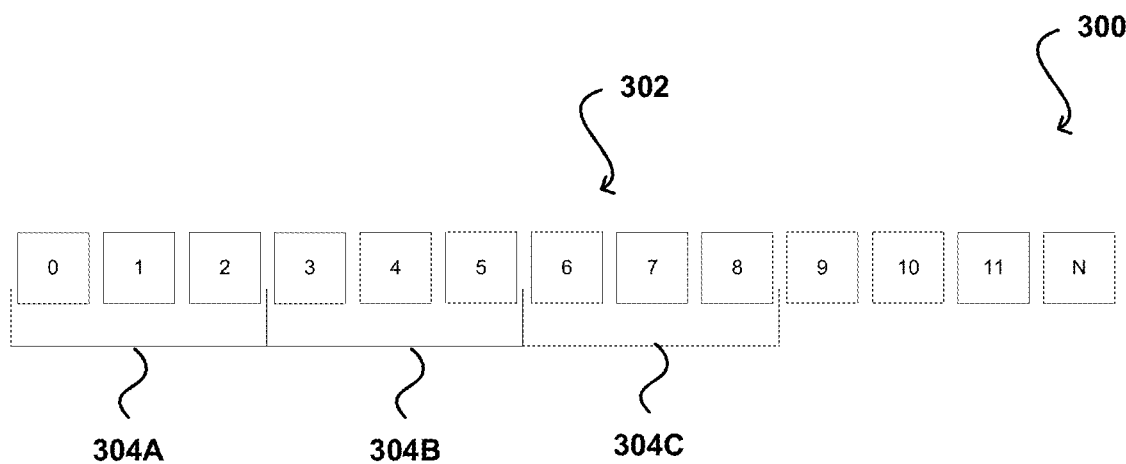

FIG. 3A is a schematic representation 300 of channel fitting where a set of cores 302 is illustrated for processing one or more transcoding operations associated with a plurality of channels 304A-304C. As noted above, while the illustrated configuration may be associated with the cores 302, embodiments of the present disclosure are not limited to only core allocation and may include other network resources, such as cards and the like. In this example, each of the channels 304A-304C may be determined to operate on three cores 302. As noted, the number of cores may be determined, at least in part, due to an analysis of one or more performance affecting parameters of the channels, the underlying hardware configurations, and the like. In at least one embodiment, a test harness is used to determine the number of cores 302 to process the channels 304A-304C. However, it should be appreciated that the selection of the cores may also be based on a database where the parameters of the channels 304A-304C match an existing core configuration.

In this example, channel 304A has been assigned to consecutive cores 302 identified as 0, 1, and 2. As described herein, positioning the operation on consecutive cores may provide benefits such as increasing a likelihood that each of the cores 302 has access to the same cache, decreasing a likelihood that the cores 302 are associated with different sockets, and the like. In this example, there are 12 identified cores 302 (0-11), but as indicated, there may be any reasonable number of cores 302 within the set. For the three channels 304A-304C, each channel is assigned to three consecutive cores, which in this example corresponds to the channel 304A with cores identified as 0-2, the channel 304B with cores identified as 3-5, and the channel 304C with cores identified as 6-8. Additional processes may then be assigned to the remaining cores (e.g., cores identified as 9-N), to increase a density for the server. For example, a process that used two cores could be assigned to cores identified as 9 and 10. Furthermore, in at least one embodiment, various administrative tasks may also be designated to one of the remaining cores 302, thereby further increasing density for the server.

Figure 3B:
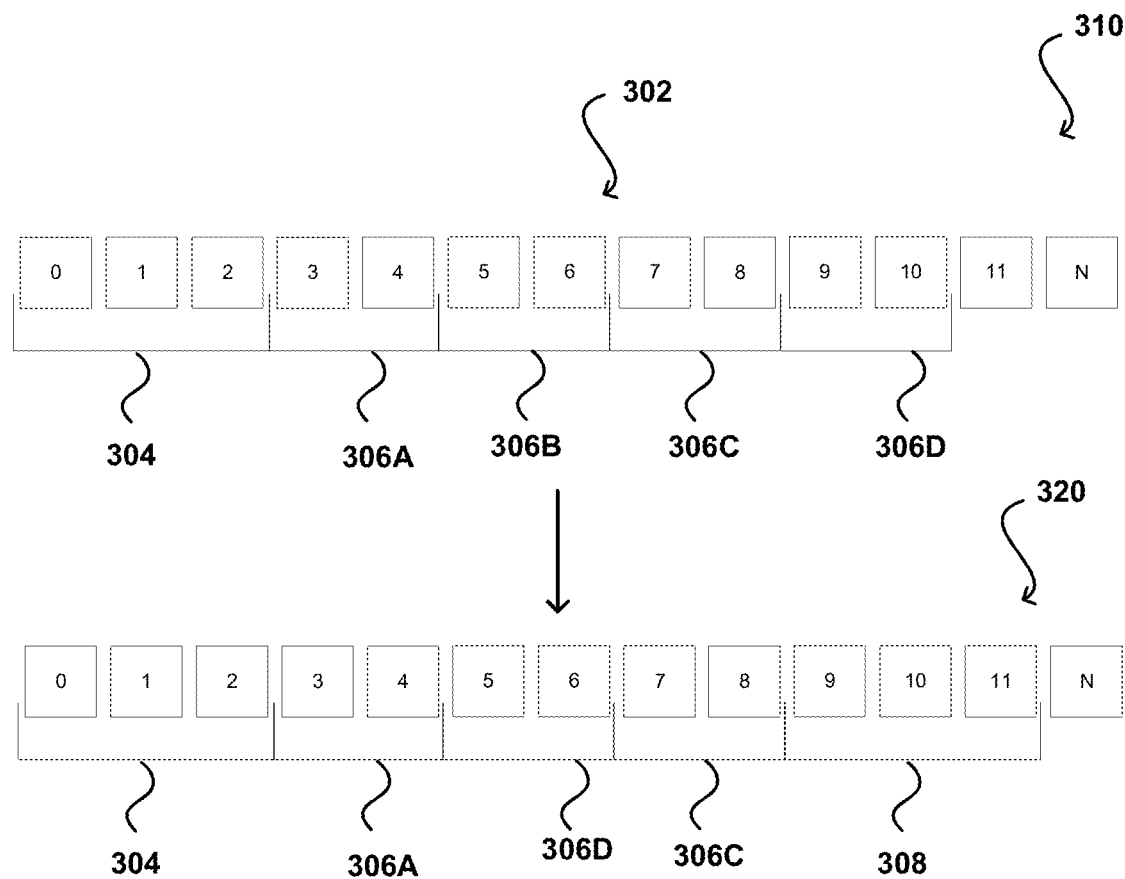

FIG. 3B illustrates schematic representations 310,320 of channel fitting where the set of cores 302 is illustrated for processing one or more transcoding operations associated with a plurality of channels 304, 306A-306D. In this example, the channel 304 is assigned to three cores, which are identified as 0-2 in this example. Because the set 302 includes at least 12 cores (or more, as denoted by N), additional channels may also run on the same server to increase the density. For example, the channels 306A-306D may be processed on eight total cores 302, where each channel 306A-306D is assigned to two cores 302. As noted above, the core assignments may be across consecutive cores, where channel 306A is associated with the cores identified as 3 and 4, the channel 306B is associated with the cores identified as 5 and 6, the channel 306C is associated with the cores identified as 7 and 8, and the channel 306D is associated with the cores identified as 9 and 10.

During operations, one or more channels may be paused or may complete, thereby freeing up one or more cores 302. For example, if the operation associated with cores identified as 5 and 6 (e.g., channel 306B) were to pause or end, then there would be a gap of consecutive cores between the channel 306A and the channel 306C. While the gap may not affect operations, it may not provide the desired density on the server. For example, if a third channel 308 needed three cores 302 for processing, if the third channel 308 were to be added to the representation 320, it would span across cores identified as 5, 6, and 11, which as noted above, may lead to various inefficiencies due to memory locations, sockets, buses, and the like. Accordingly, embodiments of the present disclosure may utilize core migration in order to provide consecutive cores for different transcoding operations.

As shown, the schematic representation 320 illustrates the core migration, to show the channel 306D is moved from the cores identified as 9 and 10 to the cores identified as 5 and 6 to replace the paused or completed channel 306B. This migration frees up the cores identified as 9-11, thereby allowing the placement of the third channel 308. Now, each of the channels shown in the representation 330 is executing on consecutive cores and the core density is increased to permit an additional channel for processing.

Figure 3C:
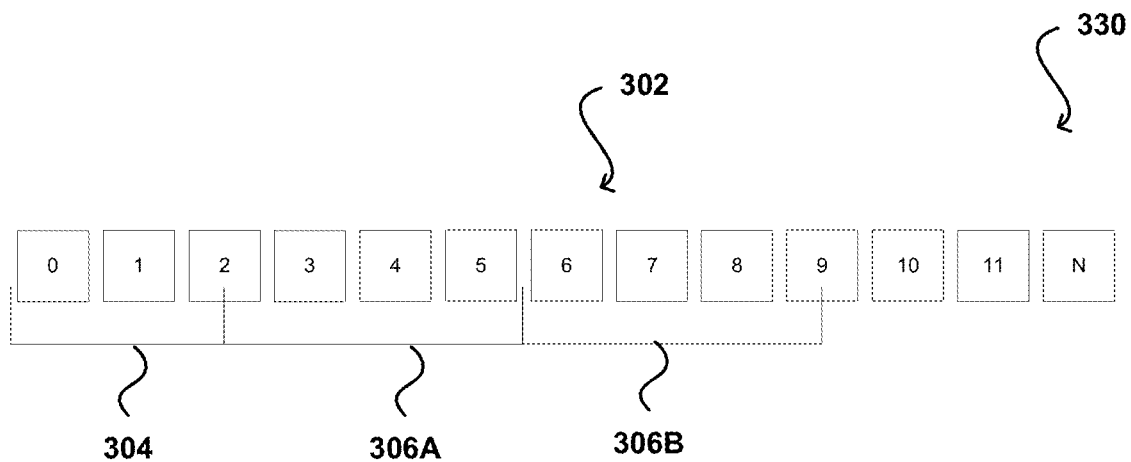
Figure 3D:
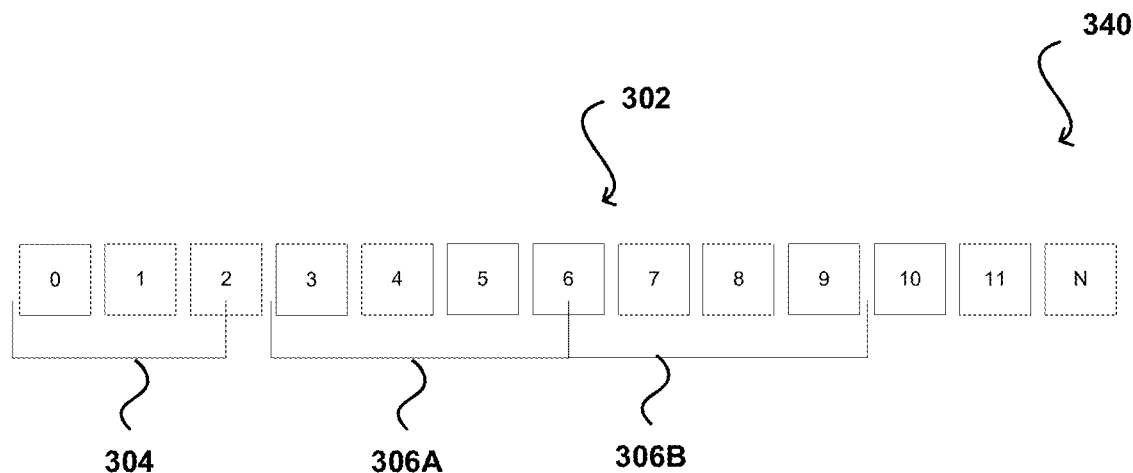

FIGS. 3C and 3D are schematic representations 330, 340 of channel fitting where a set of cores 302 is illustrated for processing one or more transcoding operations associated with a plurality of channels 304, 306A, 306B. In this example, at least some of the cores 302 are fragmented. In other words, some of the cores may execute operations for two different channels. For example, during the channel fitting process (e.g., the evaluation via the test harness, the comparison to the database, the heuristics estimations, etc.), it may be determined that only a fraction of a core is needed to efficiently and predictable perform operations associated with a channel. While in certain embodiments, a fractional core may be rounded up to the next whole number, to ensure sufficient processing, in various embodiments it may be advantageous to allow processing with fragmented cores in order to improve density on the server. In the examples, the channel 304 is set to execute across 2.5 cores and each of the channels 306A, 306B is set to execute across 3.5 cores.

If each of the channels 304, 306A, 306B was rounded up to a whole number of cores 302, then the channel 304 would occupy three cores, and each of the channels 306A, 306B would occupy four cores. As a result, the entire operation would occupy 11 of the 12 illustrated cores 302. Embodiments of the present disclosure, however, may enable core fragmentation to permit operations of two channels on a single core.

As shown in FIG. 3C, the channel 304 occupies 2.5 cores 302 and executes on the cores identified as 0, 1, and 2. Because half of the core identified as 2 is available, the channel: 306A, which is set to execute across 3.5 cores 302, may utilize the other portion of the core identified as 2, thereby setting the operating range for the channel 306A across the cores identified as 2, 3, 4, and 5. Similarly, the channel 306B can be fit to execute on 3.5 cores 302 identified as 6, 7, 8, and 9. As a result of the core fragmentation, only 9.5 of the 11 cores 302 are occupied, thereby permitting additional processing across the server.

In various embodiments, it may be advantageous to fragment cores associated with a similar set or group of channels. As shown in FIG. 3D, the channel 304 occupies 2.5 cores 302 and executes on the cores identified as 0, 1, and 2. In contrast to FIG. 3C, the fragmentations may be shared between the channels 306A, 306B in FIG. 3D, which positions the channel 306A to execute across the cores identified as 3, 4, 5, and 6 and positions the channel 306B to execute across the cores identified as 6, 7, 8, and 9. In this example, the core identified as 9 is no longer fragmented. In both FIGS. 3C and 3D, 9.5 total cores are occupied, but in FIG. 3D, the channel 304 does not share a fragmented core 302 with the channel 306A. It should be appreciated that core fragmentation may be particularly selected based on one or more factors, as noted herein, including underlying hardware configurations, among other factors.

Figure 3E:
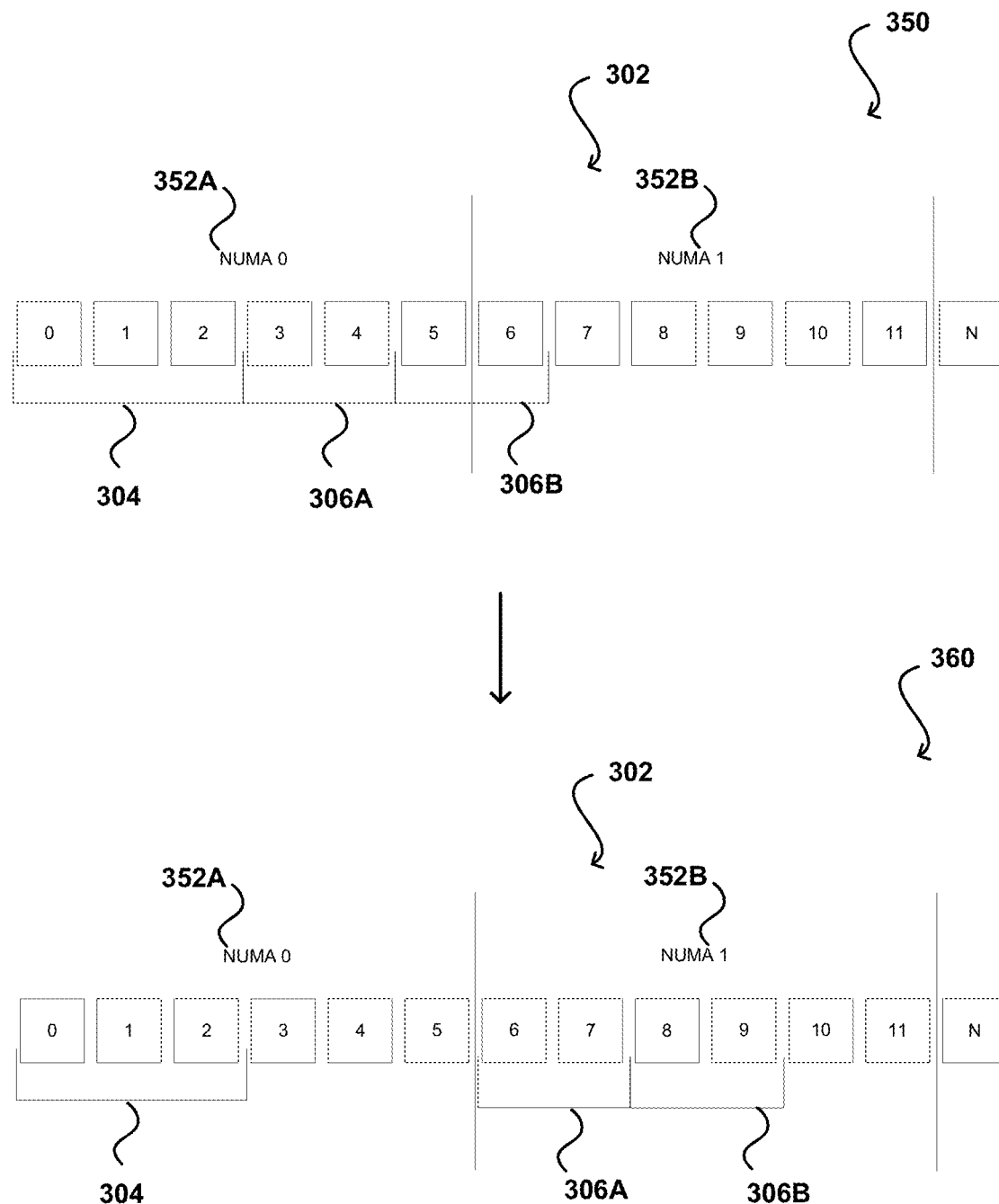

FIG. 3E includes schematic representations 350, 360 of channel fitting where the set of cores 302 is illustrated for processing one or more transcoding operations associated with a plurality of channels 304, 306A-306B. In this example, the set of cores 302 is divided into different zones 352A, 352B, which in this example are associated with a shared memory architecture referred to as non-uniform memory access (NUMA). With NUMA, a computing system may be composed of a number of singular nodes in a way that the aggregate memory is shared between all nodes. As a result, each core (e.g., CPU) can access memory associated with other NUMA nodes. In this example, NUMA 0 includes the cores identified as 0-5 and NUMA 1 includes the cores identified as 6-11.

In the configuration of representation 350 NUMA 0 includes the channel 304 and the channel 306A. However, as shown, the channel 306B is split across NUMA 0 and NUMA 1 such that channel 306B executes on the cores identified as 5 and 6. This may be undesirable for memory access, and as a result, channel fitting and/or core assignment operations may also allocate different channels to different NUMA zones. For example, as shown in the representation 360, the channel 304 may remain on NUMA 0 but the channel 306A may be positioned on NUMA 1 with the channel 306B, and as a result, these channels may be set to share a NUMA zone.

FIG. 3F illustrates schematic representations 370, 380, 385, 390, 395 of channel fitting where a set of cores 302 are separated into NUMA zones 352A, 352B and different channels 304, 306 (e.g., events) are allocated across various cores. In these representations, the "X" indicates a core that may be utilized by a given channel 304, 306.

In the representation 370, no pinning is shown and each of the channels 304, 306A, 306B can use any core 302 within either zone 352A, 352B. However, in the representation 380, specific channels 304, 306 are fit or otherwise pinned to specific cores 302 within specific zones 352A, 352B. For example, in this example, Event 0 is pinned to the cores identified as 0-7 within NUMA 0. Additionally, Event 1 is pinned to the cores identified as 8-15 within NUMA 1.

Additional events may be added with different configurations for pinning or otherwise fitting channels, as described above. For example, the representation 385 illustrates both Event 0 and Event 1 allocated to NUMA 0, but Event 0 is associated with the cores identified as 0-3 and Event 1 is associated with the cores identified as 4-7. On the other hand, Event 2 is wholly allocated to NUMA 1 and is associated with the cores identified as 8-15. In another example shown in representation 390, Event 0 and Event 1 are both fit to NUMA 0, with Event 0 associated with the cores identified as 0-3 and Event 1 associated with the cores identified as 4-7. Event 2 and Event 3 are fit to NUMA 1, with Event 2 associated with the cores identified as 8-11 and Event 3 associated with the cores identified as 12-15. As shown in these representations 380, 385, 390, no cores are shared between events.

The representation 395 illustrates shared cores between events. For example, Event 0, Event 1, and Event 2 are all assigned to NUMA 0. Event 0 is associated with the cores identified as 0-2, Event 1 is associated with the cores identified as 2-5, and Event 2 is associated with the cores identified as 5-7. As a result, cores 2 and 5 are shared between different events. However, core sharing may not be present in each zone. For example, Event 3 and Event 4 are both assigned to NUMA 1, with Event 3 associated with the cores identified as 8-11 and Event 4 associated with the cores identified as 12-15. There are no shared cores within NUMA 1. Various other embodiments and configurations may be utilized and the examples provided herein are by way of non-limiting example only.

Figure 4:
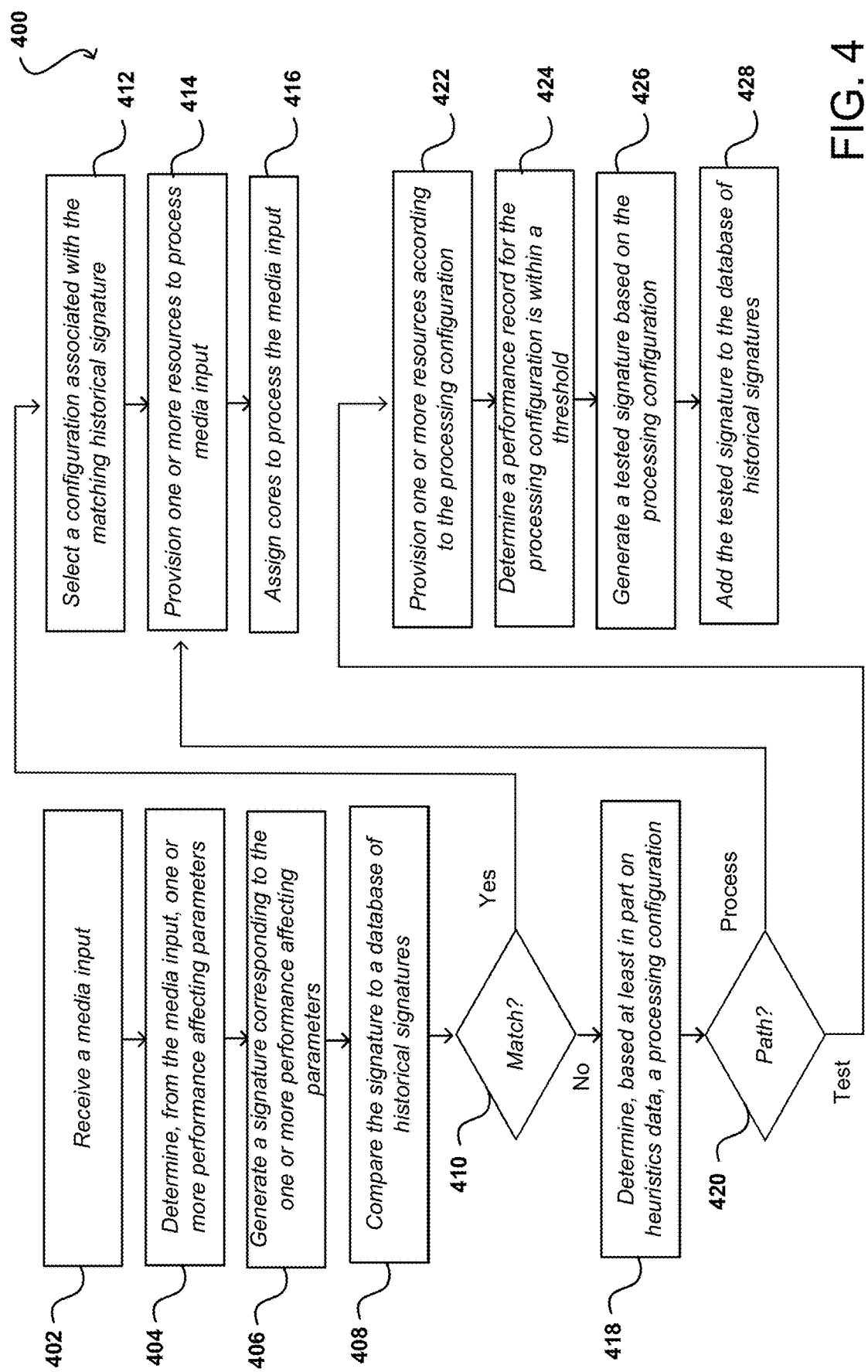
FIG. 4 illustrates an example process for assigning processing resources for a transcoding operation, in accordance with various embodiments.

FIG. 4 illustrates an example process 400 for transcoding media content that can be utilized in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In this example, a media input is received 402, such as from a media storage location or a live feed. As discussed herein, the media input may be associated with an on-demand or a scheduled transcoding process to convert one or more aspects of the media input for distribution, such as via a CDN. The media input may also include instructions or other information, as noted above, in the form of a channel that may include the content, encode, decode, and the like. As a result, the media input may include one or more parameters. The media input may be evaluated to determine one or more performance affecting parameters 404. The performance affecting parameters may correspond to parameters that may affect one or more metrics of underlying hardware performing the transcoding, such as latency or the like. Various parameters of the media input may affect performance more than others, and as a result, certain parameters may be prioritized or otherwise carry more weight than others.

The performance affecting parameters may be extracted and used to generate a signature 406, which can be compared against a database of existing historical signatures 408. For example, the existing historical signatures may be associated with previously performed transcoding operations and/or previously tested configurations that had the same or a threshold number of similar parameters. It may be determined whether there is a match between the signature for the current job and the database of historical signatures 410. A match may be a complete match of performance affecting parameters. However, it should be appreciated that in other embodiments a threshold number of parameters may be sufficient to identify a match. For example, if the media input is evaluated and a signature with four parameters is generated, and a historical signature includes those four parameters, along with additional parameters, the matching of the four parameters may be sufficient to use a configuration associated with the historical signatures. However, in other embodiments, a direct one-to-one match for each parameter of the generated signature may be required in order to determine a match is made.

If a match is found, then a configuration associated with the matching historical signature is selected 412. The configuration may correspond to an underlying hardware configuration, such as a number of cores for processing, certain types of cores, locations of cores, certain cards, and the like. Once the appropriate configuration is established, one or more resources may be provisioned according to the configuration in order to execute the transcoding operations 414 and cores and/or various other resources may be assigned to the media input according to the configuration 416.

If a match is not found, then a processing configuration may be determined 418. In at least one embodiment, the processing configuration is associated with a testing harness that is used to execute one or more operations on provider hardware in accordance with a certain configuration, to monitor one or more metrics of the hardware for the configuration, and then to determine a limit or edge (e.g., a point where the one or more metrics exceed a threshold or fall outside of a range) in order to determine a hardware configuration for a certain set of parameters. In at least one embodiment, an initial processing configuration is based on heuristics from previous operations. Additionally, in embodiments, one or more machine learning systems are used to generate a configuration profile.

Once the processing configuration is established, different paths may be used to process the media input. As noted, these paths may execute in parallel, or at least partially in parallel, or may be executed at a later time. In at least one embodiment, a path is selected 420. A first path may proceed with processing the media input according to the processing configuration. As a result, one or more resources may be provisioned, as noted above, and processing and/or assignment, and the like, may proceed. In an alternative or parallel second path, the test harness may be initialized in order to determine a specific hardware configuration that may provide for improved use of underlying hardware resources. For example, one or more resources may then be provisioned according to the processing configuration 422 and the operations may be started. As noted above, provisioning the resources may include reserving processing capacity, selecting a set of underlying hardware, assigning certain channels to particular cores, and the like. In at least one embodiment, these one or more resources are associated with the service provider, and not the source of the media input.

Operations according to the processing configuration may be monitored and one or more metrics may be compared to a threshold, range, or the like 424. If the operations are within the threshold, then the testing configuration may be considered appropriate for a given channel configuration and then a tested signature may be generated 426 and added to the historical signatures 428. In this manner, a future job associated with the same (or similar) configurations may then be executed using the testing configuration.

As noted, the testing path may be executed in parallel, or at least partially in parallel, with the processing path. For example, processing of the media input may begin while testing is executed using one or more background processes. Thereafter, configurations may be adjusted based on the results of the test path. Additionally, in various embodiments, processing may be delayed until testing is complete. Once complete, with the testing configuration now in the historical database, the new configuration can be selected as an identified match, resources may be provisioned, and processing may begin.

Figure 5:
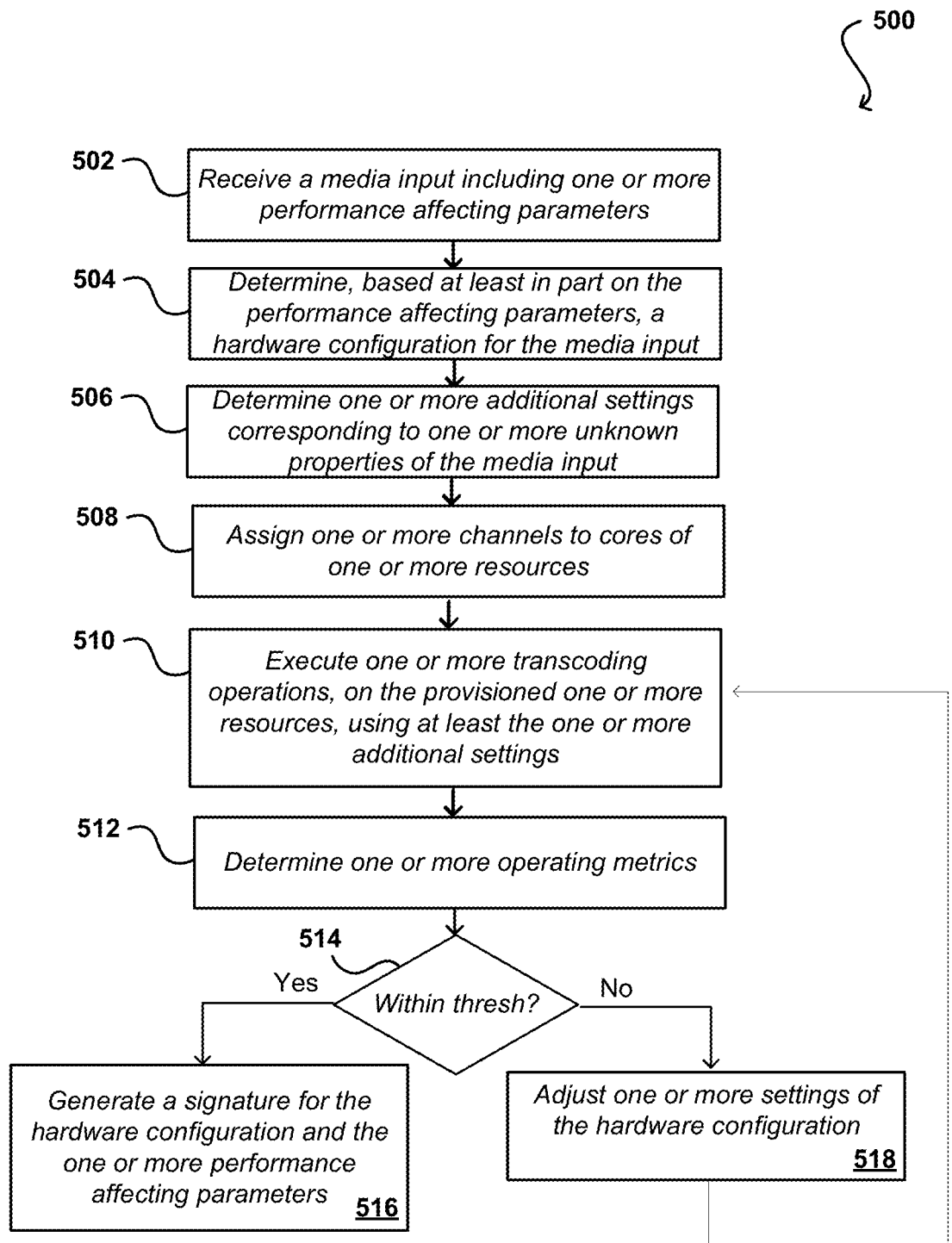
FIG. 5 illustrates an example process for deploying a testing harness, in accordance with various embodiments.

FIG. 5 illustrates an example process 500 for operating a test harness for one or more transcoding operations. In this example, a media input is received 502, which may include one or more performance affecting parameters. For example, the media input may include data associated with a codec, bitrate, latency requirements, etc. These factors, among various others, may affect performance of a transcoding process, for example, where a higher resolution may require more processing capability than a lower resolution. It should be appreciated that various performance affecting parameters may affect the process more than others.

In at least one embodiment, a hardware configuration is determined based, at least in part, on the performance affect parameters 504. For example, a number of cores for processing a channel may be selected, a type of core, and the like are non-limiting examples of hardware configurations. By way of example, a high resolution live stream may require five cores while a low resolution video-on-demand feed may only need two cores. This determination may be based, at least in part, on previous information, such as from the heuristics database noted above, and/or a machine learning system that takes, as an input, the one or more performance affecting parameters and provides an output proposed hardware configuration.

Various media inputs may include certain information that is used to determine the hardware configurations, but there may be unknown factors that are not received until a time of distribution. For example, a size of a video file may be unknown, a compression status may be unknown, and the like. Accordingly, one or more additional settings may be determined for these unknown properties 506. The settings may be evaluated and determined to provide a more conservative approach to the hardware configuration, where a "worst case" may be selected, for example, a high definition file. As a result, a lower level of file will likely be operational if the higher level is deemed appropriate with a certain hardware configuration. Additionally, the one or more additional settings may also correspond to the core assignments, such as using fragmented cores, non-sequential cores, migrated cores, and the like.

The one or more channels may then be assigned to one or more resources, which may include assignments to particular cores 508 and one or more transcoding operations are executed on those provisioned resources 510. For example, the media input may include three channels that are associated with three cores for processing each. These channels may be assigned to different cores within a server and the transcoding operations may be executed. In various embodiments, different configurations may be tested for a single media input in order to provide account for different core assignments and the like. During the operations, one or more operating metrics may be determined 512. As noted, the operating metrics may correspond to latency, CPU utilization, and the like. These metrics may then be compared against a threshold or range 514. The test harness may try to "push" or otherwise stretch the capabilities of the system, and therefore, it may be desirable to execute the transcoding operations to a level within a threshold of hardware capabilities. Accordingly, the threshold may be within a range or some amount of usage.

If the one or more metrics are within the threshold, then a signature may be generated according to that hardware configuration for those particular performance affecting parameters 516. This signature may be used to record the configuration and may be used for later operations that also have the same, or in some cases similar, performance affecting parameters. If the one or more metrics are not within the threshold, then one or more settings of the hardware configuration are adjusted 518 and the operations may be rerun. In this manner, an upper limit or threshold may be determined for different operating parameters in order to obtain efficient use of the processing capabilities of the system.

Figure 6:
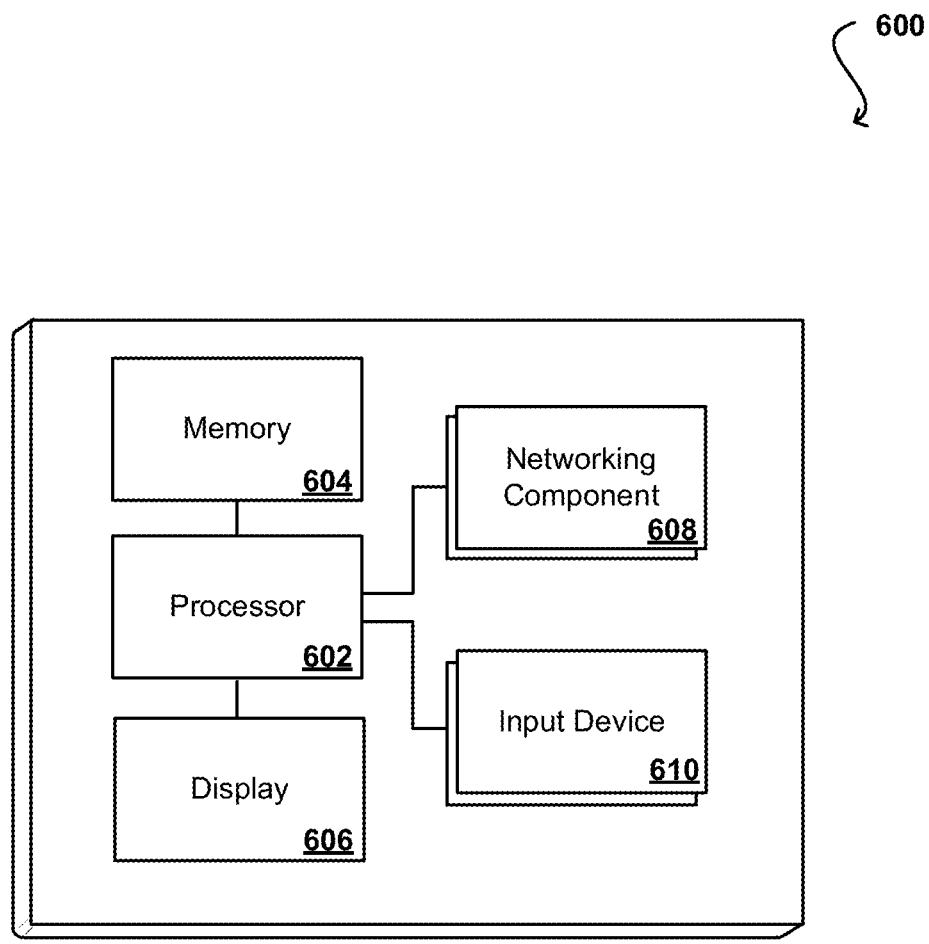
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 610 for communicating over various networks, such as a Wi-Fi, Bluetooth, RF, wired, or wireless communication systems. The device in many embodiments can communicate with a network, such as the Internet, and may be able to communicate with other such devices.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

Figure 7:
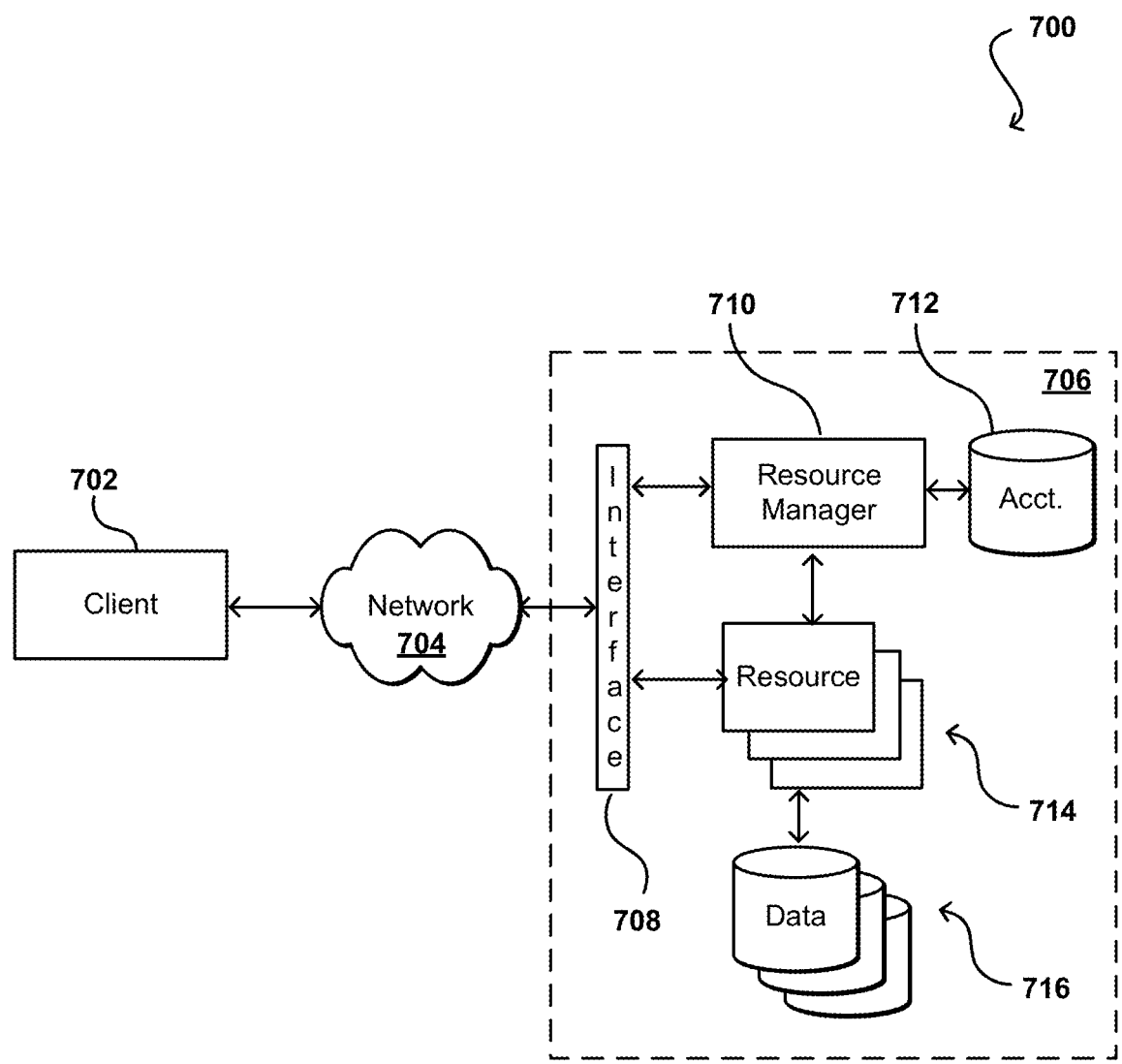
FIG. 7 illustrates an environment in which various embodiments can be implemented.

FIG. 7 illustrates an example environment 700 in which aspects of the various embodiments can be implemented. In this example a user is able to utilize a client device 702 to submit requests across at least one network 704 to a resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving media content including one or more transcoding parameters;
    determining, from the one or more transcoding parameters, a set of performance affecting parameters associated with transcoding operations;
    generating a transcoding signature corresponding to at least the set of performance affecting parameters;
    comparing the transcoding signature against a set of historical transcoding signatures corresponding to historical sets of performance affecting parameters;
    determining a difference between the transcoding signature and individual historical signatures in the set of historical signatures exceeds a threshold;
    determining, based at least in part on a heuristic database, a processing configuration for the media content;
    assigning the media content to a set of cores of one or more resources based, at least in part on the processing configuration;
    executing a transcoding operation for the media content;
    determining a performance record for the transcoding operation exceeds a performance threshold; and
    adding the transcoding signature, with the processing configuration used for the transcoding operation, to the set of historical transcoding signatures.

2. The computer-implemented method of claim 1, wherein the media content is a live stream.

3. The computer-implemented method of claim 1, wherein the one or more performance affecting parameters include at least one of a codec, a resolution, or a bitrate.

4. The computer-implemented method of claim 1, further comprising:
    receiving second media content including one or more second transcoding parameters;
    determining, from the one or more second transcoding parameters, a set of second performance affecting parameters;
    generating a second transcoding signature associated with at least the set of second performance affecting parameters;
    comparing the second transcoding signature against the set of historical signatures;
    determining the second transcoding signature matches a historical signature of the set of historical signatures; and
    assigning the second media content to a second set of cores of the one or more resources based, at least in part on a configuration of the historical signature.

5. The computer-implemented method of claim 1, further comprising:
    identifying a second set of cores of the one or more resources; and
    migrating at least part of the transcoding operation to be processed on at least a portion of the second set of cores.

6. A computer-implemented method, comprising:
    determining, from a channel and an associated signature, a set of performance affecting parameters;
    determining, based on the set of performance affecting parameters and at least a portion of historical parameters for at least a portion of the performance affecting parameters, a testing configuration for the channel;
    assigning the channel to one or more resources according to the testing configuration;
    determining one or more additional settings, for a transcoding operation using the testing configuration, corresponding to one or more unknown properties of the channel;
    executing the transcoding operation for the channel;
    determining testing values for one or more metrics, of the one or more resources, are within a threshold; and
    storing the testing configuration for the set of performance affecting parameters.

7. The computer-implemented method of claim 6, further comprising:
    determining second testing values for the one or more metrics exceed the threshold; and
    adjusting one or more attributes of the testing configuration.

8. The computer-implemented method of claim 6, wherein the one or more performance affecting parameters include at least one of a codec, a resolution, or a bitrate.

9. The computer-implemented method of claim 6, further comprising:
    receiving, from a heuristics database, historical transcoding data including at least the historical parameters and historical configurations;
    training a machine learning system based, at least in part, on the historical transcoding data;
    providing, to the trained machine learning system, the set of performance affecting parameters; and
    determining the testing configuration.

10. The computer-implemented method of claim 6, further comprising:

determining a number of cores to process the channel;
determining available cores for the one or more resources; and
assigning the channel to a set of cores of the available cores.

11. The computer-implemented method of claim 10, wherein the set of cores are consecutive cores.

12. The computer-implemented method of claim 10, wherein the set of cores are associated with at least one of a common socket, a common die, a common bus, or a shared memory cache.

13. The computer-implemented method of claim 10, wherein at least one core of the set of cores is a fragmented core that shares at least a portion of core processing capability with at least one additional operation.

14. The computer-implemented method of claim 6, further comprising:
determining available cores for the one or more resources;
assigning the channel to a set of cores of the available cores;
identifying a second set of the available cores; and
migrating at least a portion of the channel to at least one core of the second set of the available cores.

15. A system, comprising:
at least one processor; and
memory including instructions that, when executed by the at least one processor, cause the system to:
determine, from a channel and an associated signature, a set of performance affecting parameters;
determine, based on the set of performance affecting parameters and at least a portion of historical parameters for at least a portion of the performance affecting parameters, a testing configuration for the channel;
assign the channel to one or more resources according to the testing configuration;
determine one or more additional settings, for a transcoding operation using the testing configuration, corresponding to one or more unknown properties of the channel;
execute the transcoding operation for the channel;
determine testing values for one or more metrics, of the one or more resources, are within a threshold; and
store the testing configuration for the set of performance affecting parameters.

16. The system of claim 15, wherein the instructions when executed further cause the system to:
determine second testing values for the one or more metrics exceed the threshold; and
adjust one or more attributes of the testing configuration.

17. The system of claim 15, wherein the one or more performance affecting parameters include at least one of a codec, a resolution, or a bitrate.

18. The system of claim 15, wherein the instructions when executed further cause the system to:
determine a number of cores to process the channel;
determine available cores for the one or more resources; and
assign the channel to a set of cores of the available cores.

19. The system of claim 18, wherein the set of cores are associated with at least one of a common socket, a common die, a common bus, or a shared memory cache.

20. The system of claim 18, wherein at least one core of the set of cores is a fragmented core that shares at least a portion of core processing capability with at least one additional operation.

* * * * *